(12) United States Patent
Nakajima et al.

(10) Patent No.: US 9,846,519 B2
(45) Date of Patent: Dec. 19, 2017

(54) INPUT DEVICE, AND METHOD AND PROGRAM FOR CONTROLLING THE SAME

(71) Applicant: ALPS ELECTRIC CO., LTD., Tokyo (JP)

(72) Inventors: Satoshi Nakajima, Miyagi-ken (JP); Satoshi Hayasaka, Miyagi-ken (JP); Shinichi Sagawai, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 237 days.

(21) Appl. No.: 14/941,368

(22) Filed: Nov. 13, 2015

(65) Prior Publication Data
US 2016/0179250 A1   Jun. 23, 2016

(30) Foreign Application Priority Data
Dec. 22, 2014   (JP) .................................. 2014-259522

(51) Int. Cl.
*G06F 3/044*   (2006.01)
(52) U.S. Cl.
CPC .................................... *G06F 3/044* (2013.01)
(58) Field of Classification Search
CPC ...................................................... G06F 3/044
See application file for complete search history.

(56) References Cited

U.S. PATENT DOCUMENTS

| | | | |
|---|---|---|---|
| 2009/0095540 A1* | 4/2009 | Zachut | G06F 3/044 178/18.03 |
| 2010/0073301 A1* | 3/2010 | Yousefpor | G06F 3/044 345/173 |
| 2012/0092296 A1* | 4/2012 | Yanase | G06F 3/0416 345/174 |
| 2012/0139849 A1* | 6/2012 | Syu | G06F 3/0416 345/173 |
| 2014/0085259 A1* | 3/2014 | Lee | G06F 3/0488 345/174 |
| 2015/0346903 A1* | 12/2015 | O'Connor | G09G 5/003 345/173 |

FOREIGN PATENT DOCUMENTS

JP   2010-244132   10/2010

* cited by examiner

*Primary Examiner* — Ibrahim Khan
(74) *Attorney, Agent, or Firm* — Beyer Law Group LLP

(57) ABSTRACT

Threshold values smaller than degrees of proximity of an object indicated by detection data at peak positions are set based on detection data of the peak positions at which a degree of proximity of the object is higher than that of surrounding detection positions. An evaluation value according to an area of a region on a detection surface occupied by a group of detection positions, including the peak positions, in which degrees of proximity of the object indicated by detection data are higher than the threshold values, is calculated, and it is determined whether the object in proximity to the peak position is a finger or a palm based on the evaluation value.

12 Claims, 9 Drawing Sheets

INPUT DEVICE, AND METHOD AND PROGRAM FOR CONTROLLING THE SAME

CLAIM OF PRIORITY

This application claims benefit of Japanese Patent Application No. 2014-259522 filed on Dec. 22, 2014, which is hereby incorporated by reference.

BACKGROUND OF THE INVENTION

1. Field of the Invention

The present invention relates to an input device that inputs information according to a state of proximity of an object using a change in capacitance or the like, and a method and a program for controlling the input device, and particularly, to an input device that inputs information according to an operation of a finger, a pen, or the like in various information devices such as a computer.

2. Description of the Related Art

Since a sensor that detects a change in capacitance can detect the proximity of an object (for example, a finger or a pen) with a simple configuration, the sensor has been widely used for user interface devices of various electronic devices, such as a touch pad of a notebook computer or a touch panel of a smart phone.

In Japanese Unexamined Patent Application Publication No. 2010-244132, a user interface device that determines a state of proximity of an object to a touch panel using a detection signal output from a capacitive touch panel is described. This user interface device determines whether the object in proximity to the touch panel is a finger or a palm, and selects an application to be executed, based on a result of the determination and coordinates of a proximity position on the touch panel.

In Japanese Unexamined Patent Application Publication No. 2010-244132 above, a method of using a positional distribution of a capacitance change is described as a method of determining whether the object in proximity to the touch panel is a finger or a palm. In this method, the object is determined to be a finger when a mountain of the distribution of the capacitance change is relatively steep, and the object is determined to be a palm when the mountain is relatively gentle.

However, how to evaluate the steepness of the mountain of the distribution is not specifically described in Japanese Unexamined Patent Application Publication No. 2010-244132. For example, a method of evaluating the steepness by examining a frequency spectrum of a distribution curve is considered. However, in this method, there are problems in that an amount of calculation increases, and a processing time becomes long.

Further, in Japanese Unexamined Patent Application Publication No. 2010-244132, another method of discriminating between a finger and a palm includes a method of counting the number of sensor electrodes in which a change in capacitance greater than a predetermined threshold value is detected. The counted value indicates the width of a contact region of the object. A finger is determined to come in contact when the counted value is smaller than the predetermined threshold value, and a palm is determined to come in contact when the count value is greater than the predetermined threshold value.

However, in this method, when the threshold value for determination is set to be low, the difference between the finger and the palm becomes small in the counted value, and accordingly, there is a problem in that discrimination between a finger and a palm becomes difficult. On the other hand, when the threshold value for determination is set to be high, there is a problem in that it is difficult to detect the contact of the object when the change in capacitance is small (for example, when the object makes weak contact).

SUMMARY OF THE INVENTION

The present invention provides an input device capable of accurately determining whether an object in proximity to a detection surface is a finger or a palm through a simple process, and a method and a program for controlling the input device.

A first aspect of the present invention relates to an input device that inputs information according to a state of proximity of an object to a detection surface. This input device includes: a sensor unit configured to detect a degree of the proximity of the object at a plurality of detection positions on the detection surface, and generate detection data indicating a result of the detection for each of the plurality of detection positions; a peak position specifying unit configured to specify, as a peak position, the detection position at which the degree of the proximity of the object is higher than that of surrounding detection positions based on the plurality of detection data generated for the plurality of detection positions; a threshold value setting unit configured to set, based on the detection data at the peak position, a threshold value smaller than the degree of the proximity of the object indicated by the detection data; an evaluation value calculation unit configured to calculate an evaluation value according to an area of a region on the detection surface occupied by a group of detection positions including the peak position in which the degree of the proximity of the object indicated by the detection data is higher than the threshold value; and a determination unit configured to determine whether the object in proximity to the peak position is a finger or a palm based on the evaluation value.

According to the above configuration, the threshold value smaller than the degree of the proximity of the object indicated by the detection data at the peak position is set based on the detection data at the peak position at which the degree of the proximity of the object is higher than that of surrounding detection positions. The evaluation value according to an area of a region on the detection surface occupied by a group of detection positions including the peak position in which the degree of the proximity of the object indicated by the detection data is higher than the threshold value is calculated, and it is determined whether the object in proximity to the peak position is a finger or a palm based on the evaluation value. Accordingly, the difference between the proximity of a finger and the proximity of a palm increases in an area of the region in which the detection data exceeds the threshold value, and the difference between the proximity of the finger and the proximity of the palm also increases in the evaluation value. Therefore, the finger and the palm are accurately discriminated based on the evaluation value.

Preferably, the threshold value setting unit may set the threshold value indicating the degree of the proximity at a predetermined percentage of the degree of the proximity indicated by the detection data generated for the peak position.

Alternatively, the threshold value setting unit may set the threshold value indicating a degree of proximity lower by a predetermined value than the degree of the proximity indicated by the detection data generated for the peak position.

Preferably, the evaluation value calculation unit may count, as a first detection position number, the number of detection positions in a first detection position group arranged continuously in a first direction in which the peak position is included and the degree of the proximity indicated by the detection data is higher than the threshold value. The evaluation value calculation unit may count, as a second detection position number, the number of detection positions in a second detection position group arranged continuously in a second direction perpendicular to the first direction in which the peak position is included and the degree of the proximity indicated by the detection data is higher than the threshold value. The evaluation value calculation unit may calculate the evaluation value according to a product of the first detection position number and the second detection position number.

Accordingly, the evaluation value is calculated easily.

Preferably, the evaluation value calculation unit may count the first detection position number from which the number of detection positions separated from the peak position relative to one detection position has been excluded when the degree of the proximity indicated by the detection data at the adjacent detection position separated from the peak position with respect to the one detection position in the first detection position group exceeds a predetermined change width and is higher than the degree of proximity indicated by the detection data at the one detection position. Further, the evaluation value calculation unit may count the second detection position number from which the number of detection positions separated from the peak position relative to one detection position has been excluded when the degree of the proximity indicated by the detection data at the adjacent detection position separated from the peak position with respect to the one detection position in the second detection position group exceeds a predetermined change width and is higher than the degree of proximity indicated by the detection data at the one detection position.

Accordingly, a region in which the detection data exceeds the threshold value due to an influence from an object other than the object in proximity to the peak position can be excluded from a target region of the evaluation value.

Preferably, the input device may further include a noise level measurement unit configured to measure the level of noise superimposed on the detection data based on the plurality of detection data generated for the plurality of detection positions. The threshold value setting unit may change the threshold value according to a result of the measurement of the noise level.

Thus, it is unlikely that an erroneous determination occurs due to the influence of the noise.

A second aspect of the present invention relates to a method of controlling an input device in which a computer controls the input device that includes a sensor unit configured to detect a degree of proximity of an object at a plurality of detection positions on a detection surface and generate detection data indicating a result of the detection for each of the plurality of detection positions, and that inputs information according to a state of proximity of the object to the detection surface. This method of controlling an input device includes steps of: specifying, as a peak position, the detection position at which the degree of proximity of the object is higher than that of surrounding detection positions, based on the plurality of detection data generated for the plurality of detection positions; setting, based on the detection data at the peak position, a threshold value smaller than the degree of the proximity of the object indicated by the detection data; calculating an evaluation value according to an area of a region on the detection surface occupied by a group of detection positions including the peak position in which the degree of proximity of the object indicated by the detection data is higher than the threshold value; and determining whether the object in proximity to the peak position is a finger or a palm based on the evaluation value.

Preferably, the step of setting the threshold value may include setting the threshold value indicating the degree of the proximity at a predetermined percentage of the degree of the proximity indicated by the detection data generated for the peak position.

Alternatively, the step of setting the threshold value may include setting the threshold value indicating a degree of proximity lower by a predetermined value than the degree of the proximity indicated by the detection data generated for the peak position.

Preferably, the step of calculating the evaluation value may include steps of: counting, as a first detection position number, the number of detection positions in a first detection position group arranged continuously in a first direction in which the peak position is included, and the degree of the proximity indicated by the detection data is higher than the threshold value; counting, as a second detection position number, the number of detection positions in a second detection position group arranged continuously in a second direction perpendicular to the first direction in which the peak position is included, and the degree of the proximity indicated by the detection data is higher than the threshold value; and calculating the evaluation value according to a product of the first detection position number and the second detection position number.

Preferably, the step of counting the first detection position number may include counting the first detection position number from which the number of detection positions separated from the peak position relative to one detection position has been excluded when the degree of the proximity indicated by the detection data at the adjacent detection position separated from the peak position with respect to the one detection position in the first detection position group exceeds a predetermined change width and is higher than the degree of proximity indicated by the detection data at the one detection position. Further, the step of counting the second detection position number may include counting the second detection position number from which the number of detection positions separated from the peak position relative to one detection position has been excluded when the degree of the proximity indicated by the detection data at the adjacent detection position separated from the peak position with respect to the one detection position in the second detection position group exceeds a predetermined change width and is higher than the degree of proximity indicated by the detection data at the one detection position.

Preferably, the method of controlling an input device may further include a noise level measurement step of measuring the level of noise superimposed on the detection data based on the plurality of detection data generated for the plurality of detection positions. The step of setting the threshold value may include changing the threshold value according to a result of the measurement of the noise level.

A third aspect of the present invention relates to a program for causing a computer to execute the method of controlling an input device according to the second aspect of the present invention.

According to the present invention, it is possible to accurately determine whether an object in proximity to the detection surface is a finger or a palm through a simple process.

BRIEF DESCRIPTION OF THE DRAWINGS

FIG. 3A is a diagram illustrating detection positions at which detection data has a value higher than a threshold value around the peak position, and FIG. 3B is a graph illustrating the detection data of a series of detection positions arranged in an X direction through the peak position;

DESCRIPTION OF THE PREFERRED EMBODIMENTS

First Embodiment

Figure 1:
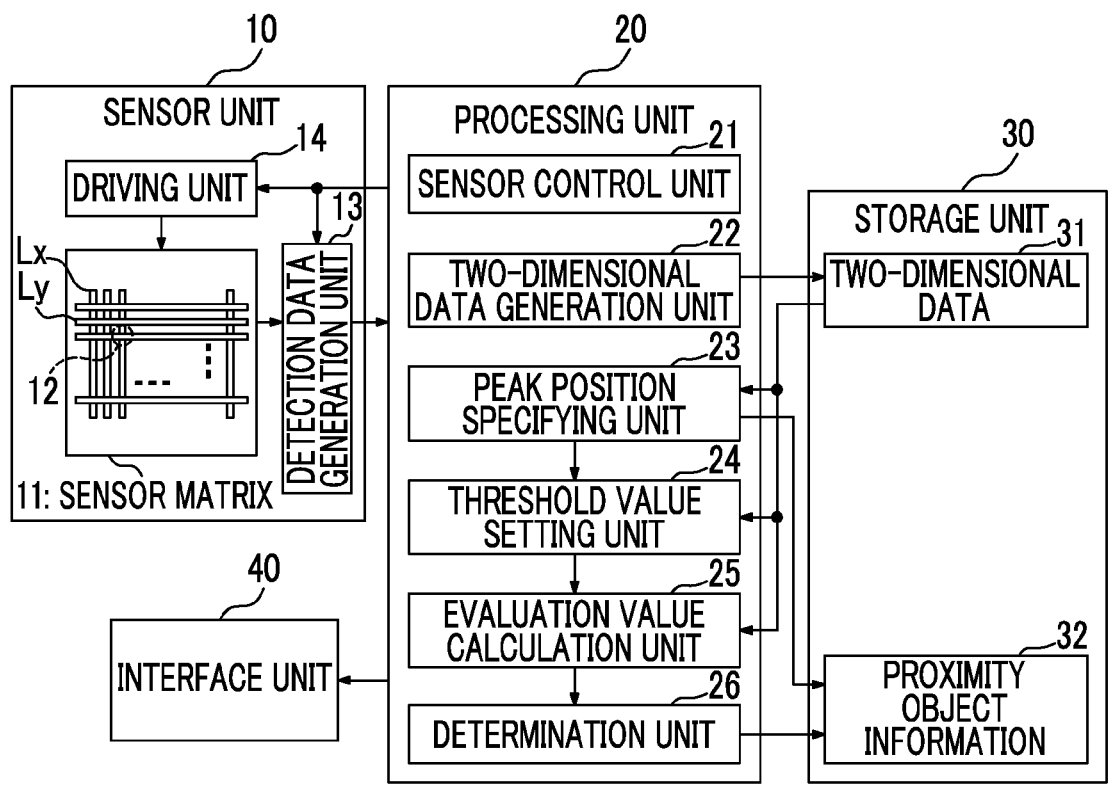
FIG. 1 is a diagram illustrating an example of a configuration of an input device according to an embodiment of the present invention.

FIG. 1 is a diagram illustrating an example of a configuration of an input device according to an embodiment of the present invention.

The input device illustrated in FIG. 1 includes a sensor unit 10, a processing unit 20, a storage unit 30, and an interface unit 40. The input device according to this embodiment is a device that inputs information according to a state of proximity by causing an object such as a finger or a pen to be in proximity to a detection surface in which sensors are provided. "Proximity" in the present specification includes both of proximity in a contact state and proximity in a non-contact state.

Sensor Unit 10

The sensor unit 10 detects degrees of the proximity of the object such as a finger or a pen at a plurality of detection positions distributed on the detection surface. For example, the sensor unit 10 includes a sensor matrix 11 in which capacitive sensor elements (capacitors) 12 of which the capacitance changes according to proximity of the object are formed in a matrix form, a detection data generation unit 13 that generates detection data according to the capacitance of the capacitive sensor element 12, and a driving unit 14 that applies a driving voltage to the capacitive sensor element 12.

The sensor matrix 11 includes a plurality of driving electrodes Lx extending in a vertical direction (Y direction), and a plurality of detection electrodes Ly extending in a horizontal direction (X direction). The plurality of driving electrodes Lx are arranged in parallel in the horizontal direction (X direction), and the plurality of detection electrodes Ly are arranged in parallel in the vertical direction (Y direction). The plurality of driving electrodes Lx and the plurality of detection electrodes Ly intersect each other in a lattice form, and are insulated from each other. The capacitive sensor element 12 is formed near an intersecting portion of the driving electrode Lx and the detection electrode Ly. Further, in the example of FIG. 1, shapes of the electrodes (Lx and Ly) are drawn in a strip shape, but may be other shapes (for example, a diamond pattern).

The driving unit 14 applies the driving voltage to the capacitive sensor element 12 of the sensor matrix 11. Specifically, the driving unit 14 sequentially selects one driving electrode Lx from among the plurality of driving electrodes Lx under the control of the processing unit 20, and periodically changes a potential of the selected driving electrode Lx. A potential of the driving electrode Lx changes in a predetermined range. Accordingly, the driving voltage applied to the capacitive sensor element 12 formed near an intersecting point of the driving electrode Lx and the detection electrode Ly changes in a predetermined range, and the capacitive sensor element 12 is charged or discharged.

The detection data generation unit 13 generates the detection data according to a charge transferred in each detection electrode Ly when the capacitive sensor element 12 is charged or discharged due to application of the driving voltage by the driving unit 14. That is, the detection data generation unit 13 samples the charge transferred in each detection electrode Ly at a timing synchronized with a periodic change in the driving voltage of the driving unit 14, and generates the detection data according to the result of the sampling.

For example, the detection data generation unit 13 includes a capacitance-to-voltage conversion circuit (CV conversion circuit) that outputs a voltage according to the capacitance of the capacitive sensor element 12, and an analog-to-digital conversion circuit (AD conversion circuit) that converts an output signal of the CV conversion circuit into a digital signal and outputs the digital signal as detection data.

The CV conversion circuit samples the charge transferred in the detection electrode Ly under control of the processing unit 20 each time the driving voltage of the driving unit 14 periodically changes and the capacitive sensor element 12 is charged or discharged. Specifically, each time a positive or negative charge is transferred in the detection electrode Ly, the CV conversion circuit transfers this charge or a charge proportional thereto to a capacitor for reference, and outputs a signal according to a voltage generated in the capacitor for reference. For example, the CV conversion circuit outputs a signal according to an integration value or an average value of a charge periodically transferred in the detection electrode Ly or a charge proportional thereto. The AD conversion circuit converts the output signal of the CV conversion circuit into a digital signal in a predetermined period under control of the processing unit 20, and outputs the digital signal as detection data.

The sensor unit 10 shown in the above example detects the proximity of the object based on a change in the capacitance (mutual capacitance) generated between the electrodes (Lx, Ly), but the present invention is not limited to this example, and the proximity of the object may be detected using other various schemes. For example, the sensor unit 10 may adopt a scheme of detecting capacitance (self-capacitance) generated between an electrode and a ground due to the proximity of the object. In the case of a scheme in which self-capacitance is detected, driving voltage is applied to a detection electrode. Further, the sensor unit 10 is not limited to a capacitive type, and may be, for example, a resistive film type, an electromagnetic induction type, or the like.

Processing Unit 20

The processing unit 20 is a circuit that controls a general operation of the input device and includes, for example, a computer that performs a process according to instruction codes of a program stored in the storage unit 30, and a logic circuit that realizes a specific function. Processing of the processing unit 20 may be realized entirely by the computer and the program, or the processing may be realized partially or entirely by a dedicated logic circuit.

In the example of FIG. 1, the processing unit 20 includes a sensor control unit 21, a two-dimensional data generation unit 22, a peak position specifying unit 23, a threshold value setting unit 24, an evaluation value calculation unit 25, and a determination unit 26.

The sensor control unit 21 controls the sensor unit 10 so that the sensor unit 10 performs periodic detection operation of generating detection data at a plurality of detection positions (the capacitive sensor elements 12 of the sensor matrix 11) of the detection surface per cycle. Specifically, the sensor control unit 21 controls circuits of the driving unit 14 and the detection data generation unit 13 so that selection of the driving electrode and generation of a pulse voltage in the driving unit 14, and selection of the detection electrode and generation of the detection data in the detection data generation unit 13 are performed periodically at appropriate timings.

The two-dimensional data generation unit 22 generates two-dimensional data 31 in a matrix format that includes a plurality of detection data indicating a degree of proximity of the object at the plurality of positions of the detection surface based on the detection result of the sensor unit 10, and stores the two-dimensional data 31 in the storage unit 30.

For example, the two-dimensional data generation unit 22 stores the detection data output from the sensor unit 10 in the storage region (a current value memory) of the storage unit 30 in matrix form. The two-dimensional data generation unit 22 calculates a difference between the detection data in a matrix format stored in the current value memory and a base value in a matrix format pre-stored in another storage region (base value memory) of the storage unit 30, and stores a result of the calculation as two-dimensional data 31 in the storage unit 30. A value (base value) serving as a reference of the detection data in a state in which the object is not in proximity to the detection surface is stored in the base value memory. Each element of the two-dimensional data 31 indicates a change amount (detection data $\Delta D$) of the detection data from a state in which the object is not in proximity to the detection surface.

The peak position specifying unit 23 specifies a detection position at which a degree of the proximity of the object is higher than that of surrounding detection positions as a "peak position" based on the two-dimensional data 31 generated by the two-dimensional data generation unit 22.

For example, the peak position specifying unit 23 sequentially selects the respective items of detection data $\Delta D$ of the two-dimensional data 31, and compares the selected detection data $\Delta D$ with surrounding detection data $\Delta D$ adjacent thereto. If all of the selected items of detection data $\Delta D$ have a higher value than the adjacent detection data $\Delta D$ (for example, when the differences between the selected detection data $\Delta D$ and the adjacent detection data $\Delta D$ all exceed a predetermined threshold value), the peak position specifying unit 23 specifies the detection position on the detection surface corresponding to the selected detection data $\Delta D$ as a peak position P.

The peak position specifying unit 23 may specify the peak position P based on the detection data $\Delta D$ of the two-dimensional data 31 as described above, or may specify the peak position P based on original detection data from which the base value has not been subtracted.

Further, the peak position specifying unit 23 may not specify the detection position at which the degree of the proximity of the object indicated by the detection data $\Delta D$ is smaller than a predetermined value as the peak position P even when the degree of the proximity is relatively higher than the degree of the proximity in the surroundings. Accordingly, it is difficult for the peak of the detection data $\Delta D$ caused by noise to be processed as the peak due to the proximity of the object.

When the peak position specifying unit 23 specifies one peak position P, the peak position specifying unit 23 assigns an identification number i to the peak position P. The identification number i is information for identifying individual objects in proximity to the detection surface. The peak position specifying unit 23 stores the peak position P (hereinafter referred to as "P[i]") to which one identification number i is assigned, and the detection data $\Delta D$ (hereinafter referred to as "$\Delta D(P[i])$") corresponding to the peak position P[i] in the storage unit 30 as a bundle of information (proximity object information 32).

The threshold value setting unit 24 sets a threshold value $\Delta Dth[i]$ smaller than the degree of proximity of the object indicated by the detection data $\Delta D(P[i])$ based on the detection data $\Delta D(P[i])$ at the peak position P[i].

For example, the threshold value setting unit 24 sets the threshold value $\Delta Dth[i]$ to indicate the degree of proximity at a predetermined ratio to the degree of proximity of the object indicated by the detection data $\Delta D(P[i])$. Specifically, the threshold value setting unit 24 sets, as the threshold value $\Delta Dth[i]$, a value obtained by multiplying the detection data $\Delta D(P[i])$ by a predetermined coefficient K ($0<K<1$). The threshold value setting unit 24 stores the threshold value $\Delta Dth[i]$ in the storage unit 30 as information associated with the proximity object information 32.

The evaluation value calculation unit 25 calculates an evaluation value S[i] according to an area of a region in which the degree of the proximity is higher than the threshold value $\Delta Dth[i]$ around the peak position P[i]. That is, the evaluation value calculation unit 25 calculates the evaluation value S[i] according to an area of a region on the detection surface occupied by a group of detection positions including the peak position P[i], which is a group of detection positions in which the degree of the proximity of the object indicated by the detection data $\Delta D$ is higher than the threshold value $\Delta Dth[i]$.

For example, the evaluation value calculation unit 25 counts the number of detection positions (first detection position number) in a "first detection position group" that is a group of detection positions continuously arranged at equal intervals in the X direction on the detection surface in which the peak position P[i] is included, and the degree of the proximity of the object indicated by the detection data $\Delta D$ is higher than the threshold value $\Delta Dth[i]$. Further, the evaluation value calculation unit 25 counts the number of detection positions (second detection position number) in a "second detection position group" that is a group of detection positions continuously arranged at equal intervals in the Y direction on the detection surface in which the peak position P[i] is included, and the degree of the proximity of the object indicated by the detection data ΔD is higher than the threshold value ΔDth[i]. The evaluation value calculation unit 25 calculates the evaluation value S[i] according to a product of the first detection position number and the second detection position number.

However, when the evaluation value calculation unit 25 counts the first detection position number and the second detection position number described above, the following constraints are applied in order for the region in which the value of the detection data ΔD increases due to an influence of another object to be not included in the target region of the evaluation value S[i].

That is, when the degree of the proximity indicated by the detection data ΔD at the adjacent detection position separated from the peak position P[i] with respect to one detection position in the first detection position group exceeds a predetermined change width Wth as compared with the degree of proximity indicated by the detection data ΔD at the one detection position, the evaluation value calculation unit 25 counts the first detection position number from which the number of detection positions separated from the peak position P relative to the one detection position has been excluded. Further, when the degree of the proximity indicated by the detection data ΔD at the adjacent detection position separated from the peak position P with respect to one detection position in the second detection position group exceeds the change width Wth as compared with the degree of proximity indicated by the detection data ΔD at the one detection position, the evaluation value calculation unit 25 counts the second detection position number from which the number of detection positions separated from the peak position P relative to the one detection position has been excluded.

That is, when the degree of the proximity exceeds the change width Wth and increases despite an increase in a distance from the peak position P, a region in front of the position (direction further separated from the peak position P) is expected to be a region influenced by proximity of another object, and accordingly, the region is excluded from the target region of the evaluation value S[i].

The evaluation value calculation unit 25 stores the calculated evaluation value S[i] in the storage unit 30 as information associated with the proximity object information 32.

The determination unit 26 determines whether the object in proximity to the peak position P[i] is a finger or a palm based on the evaluation value S[i] calculated by the evaluation value calculation unit 25. For example, the determination unit 26 compares the evaluation value S[i] with a predetermined threshold value Sth, determines that the object is a palm when the evaluation value S[i] is greater than the threshold value Sth, and determines that the object is a finger when the evaluation value S[i] is smaller than the threshold value Sth. The determination unit 26 also stores the result of this determination in the storage unit 30 as information associated with the proximity object information 32 for each identification number i.

Further, the determination unit 26 determines that the contact state of the object on the detection surface is a "palm contact state" when the determination unit 26 determines that at least one of objects in proximity to the detection surface is a palm, and determines that the contact state of the object is a "finger contact state" when the determination unit 26 determines that each of the objects in proximity to the detection surface is a finger. This contact state is transmitted to another control device through the interface unit 40 to be described below, and used for a user interface based on an operation of the finger. For example, in the case of the "palm contact state", information on a contact position of the object is ignored and a specific application is executed.

Storage Unit 30

The storage unit 30 stores constant data or variable data that is used for processing in the processing unit 20. When the processing unit 20 includes a computer, the storage unit 30 may store a program executed in the computer. The storage unit 30 includes, for example, a volatile memory such as a DRAM or an SRAM, a nonvolatile memory such as a flash memory, a hard disk, or the like.

Interface Unit 40

The interface unit 40 is a circuit for exchanging data between the input device and another control device (for example, a control IC for an information device on which the input device is mounted). The processing unit 20 outputs the information (for example, coordinate information of the object, the number of objects, and the contact state) stored in the storage unit 30 from the interface unit 40 to a control device (not shown). Further, the interface unit 40 may acquire a program to be executed in a computer of the processing unit 20 from a disk drive device (not shown; a device that reads a program recorded in a non-transitory storage medium), a server, or the like, and load the program into the storage unit 30.

Next, an operation of determining a finger and a palm in the input device having the above-described configuration will be described.

Figure 2:
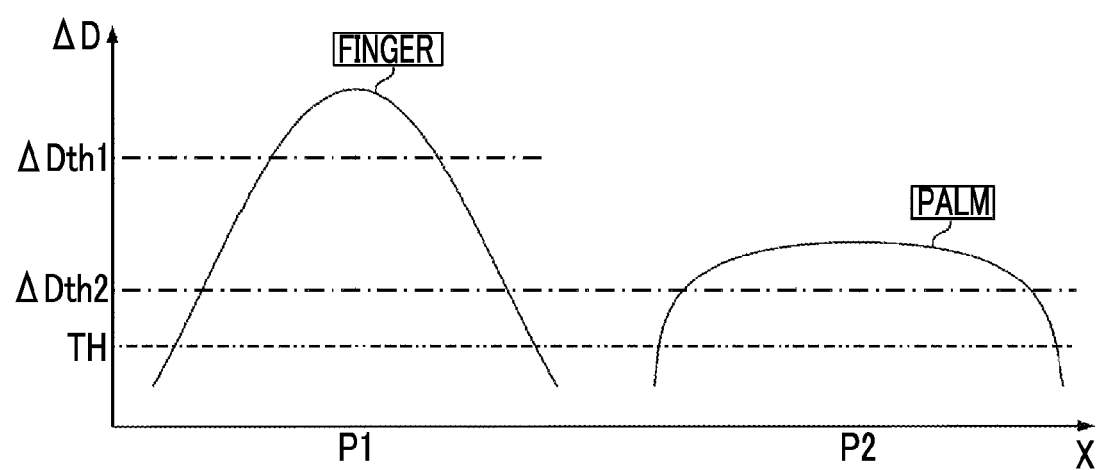
FIG. 2 is a diagram illustrating an example of a graph illustrating a positional change in detection data due to proximity of an object, and illustrates a comparison between proximity of a finger and proximity of a palm.

FIG. 2 is a diagram illustrating an example of a graph illustrating a positional change in the detection data ΔD due to proximity of the object, and illustrates comparison between proximity of the finger and proximity of the palm. As illustrated in FIG. 2, when the finger is in proximity, a region in which the detection data ΔD has a value close to the peak value is narrowed, and a decrease in the detection data ΔD from a place relatively close to the peak position starts. On the other hand, when the palm is in proximity, the region in which the detection data ΔD has the value close to the peak value is wider than that for the finger, and a decrease in the detection data ΔD from a place relatively separated from the peak position starts.

In FIG. 2, "ΔDth1" and "ΔDth2" indicate the threshold values set by the threshold value setting unit 24. "ΔDth1" indicates the threshold value for the case of the "finger", and "ΔDth2" indicates the threshold value for the case of the "palm". In the example of FIG. 2, the threshold values ΔDth1 and ΔDth2 are set to values of 80% of the detection data ΔD at peak positions P1 and P2. In the case of a "finger", since the region in which the detection data ΔD has a value close to the peak value is narrow, the region in which the value of the detection data ΔD exceeds the threshold value Dth1 is narrowed. On the other hand, in the case of a "palm", since the region in which the detection data ΔD has a value close to the peak value is wide, the region in which the value of the detection data ΔD exceeds the threshold value Dth2 is widened. That is, areas of the regions in which the value of the detection data ΔD exceeds the threshold value are very different between the case of a "finger" and the case of a "palm". As a result, the evaluation values S calculated by the evaluation value calculation unit 25 are very different between the case of the "finger" and the case of the "palm".

Meanwhile, in FIG. 2, "TH" indicates a fixed threshold value. When the threshold value is a fixed value, it is necessary for the threshold value to be set to a certain small value so as to be able to reliably detect the "finger" and the "palm". However, if the threshold value is small, a difference between the "finger" and the "palm" decreases in a width of a region in which the value of the detection data ΔD exceeds the threshold value, as illustrated in FIG. 2. That is, the difference between the "finger" and the "palm" decreases in an area of the region in which the value of the detection data ΔD exceeds the threshold value, and a difference between the "finger" and the "palm" also decreases in the evaluation value S.

Since the determination unit 26 discriminates between the "palm" and the "finger" based on whether or not the evaluation value S is greater than the threshold value Sth, the accuracy of the discrimination is improved when a difference between the "finger" and the "palm" is greater in the evaluation value S. Therefore, in the input device according to this embodiment, by relatively changing the threshold value ΔDth according to the detection data ΔD at the peak position P, the accuracy of discrimination between the "finger" and the "palm" is improved as compared with the case in which the fixed threshold value is used.

Figure 3A:
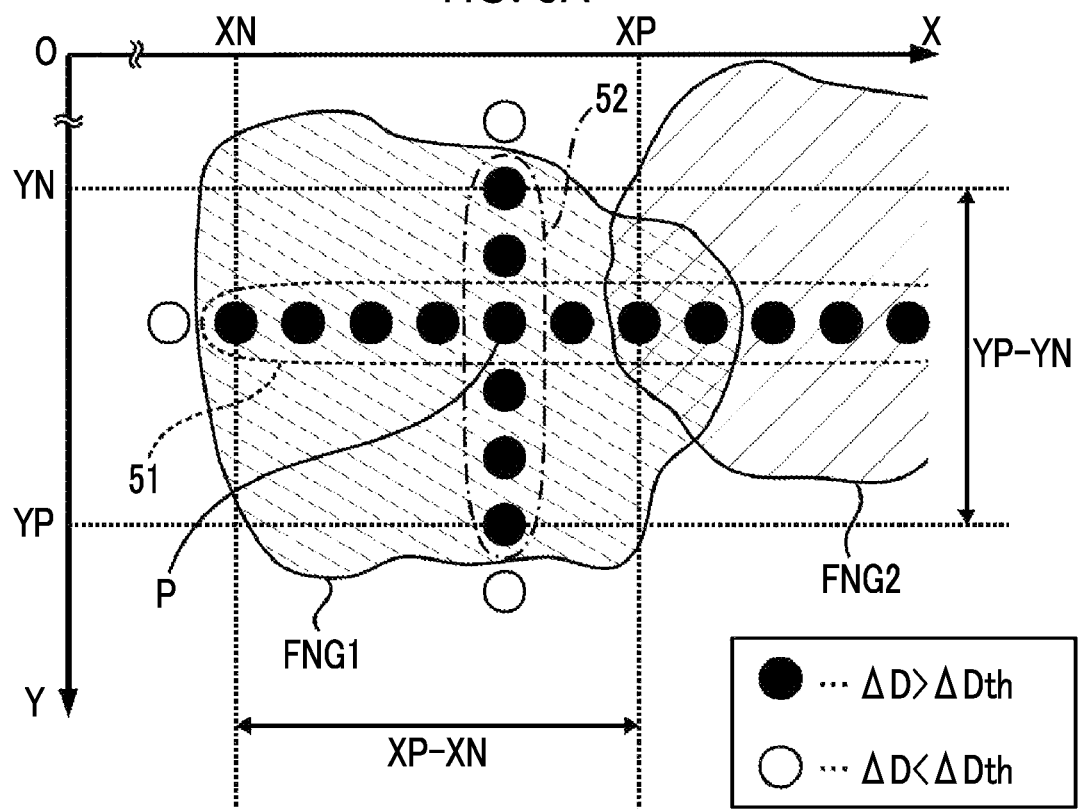
FIGS. 3A and 3B are diagrams illustrating an evaluation value calculated by an evaluation value calculation unit.
Figure 3B:
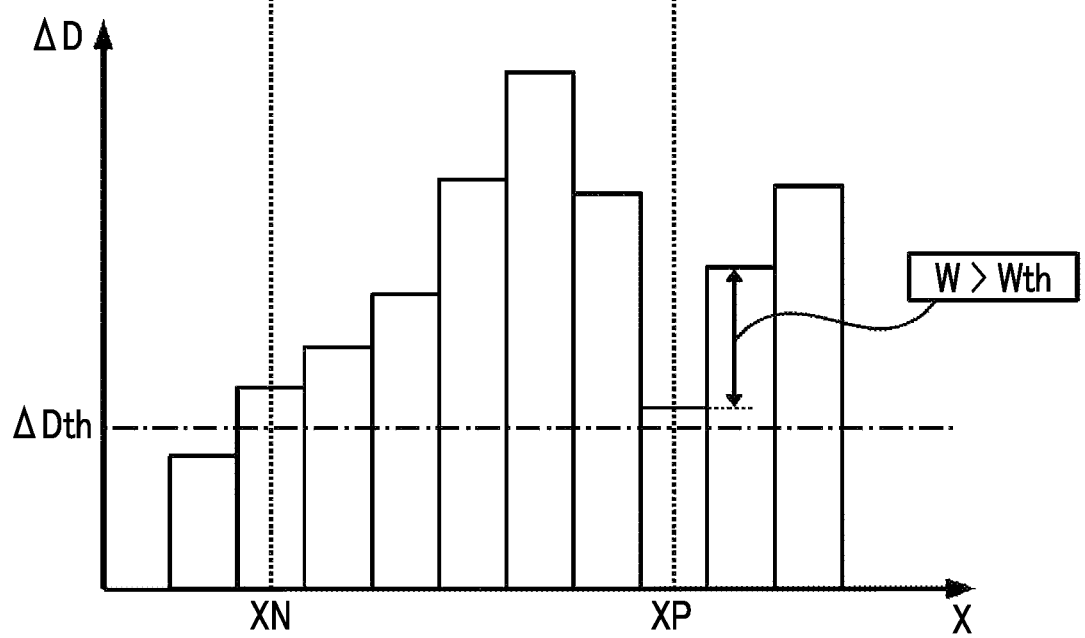

FIGS. 3A and 3B are diagrams illustrating the evaluation value S calculated by the evaluation value calculation unit 25. FIG. 3A illustrates detection positions at which the detection data ΔD has a higher value than the threshold value ΔDth around the peak position P. FIG. 3B is a graph illustrating the detection data ΔD at a series of detection positions arranged in an X direction through the peak position P.

In FIG. 3A, each of a line of the detection positions arranged continuously in the X direction and a line of detection positions arranged continuously in the Y direction is illustrated. A black circle "●" indicates a detection position at which the value of the detection data ΔD is greater than the threshold value ΔDth, and a white circle "o" indicates a detection position at which the value of the detection data ΔD is smaller than the threshold value ΔDth. The two lines of the detection positions intersect at a right angle at the peak position P. In the two lines of the detection positions, a collection of the black circles "●" arranged continuously in the X direction is a first detection position group 51, and a collection of the black circles "●" arranged continuously in the Y direction is a second detection position group 52. The evaluation value calculation unit 25 calculates a product of the number of detection positions included in the first detection position group 51 (the first detection position number) and the number of detection positions in the second detection position group 52 (second detection position number) as the evaluation value S.

As illustrated in FIG. 3A, the first detection position number indicates an extent in the X direction of a region in which the detection data ΔD has a value greater than the threshold value ΔDth, and the second detection position number indicates an extent in the Y direction of a region in which the detection data ΔD has a value greater than the threshold value ΔDth. Accordingly, the evaluation value S which is the product of the first detection position number and the second detection position number has a size according to an area of a rectangular region when region in which the detection data ΔD has a value greater than the threshold value ΔDth is regarded as a rectangular shape.

However, in the first detection position group 51, the detection data ΔD at the detection position adjacent more to the right of the second detection position to the right of the peak position P has a greater value than the detection data ΔD at the second detection position, and a difference W between the values exceeds the change width Wth. This is because there is another finger FNG2, to the right of a finger FNG1 corresponding to the peak position P, and the value of the detection data ΔD increases due to an influence thereof. Therefore, the evaluation value calculation unit 25 excludes detection positions separated from the peak position P relative to the second detection position to the right of the peak position P in the first detection position group 51 (that is, detection positions subsequent to the third detection position to the right of the peak position P) from the first detection position number. Accordingly, in the example of FIGS. 3A and 3B, the first detection position number is "6", including the peak position P.

Figure 4:
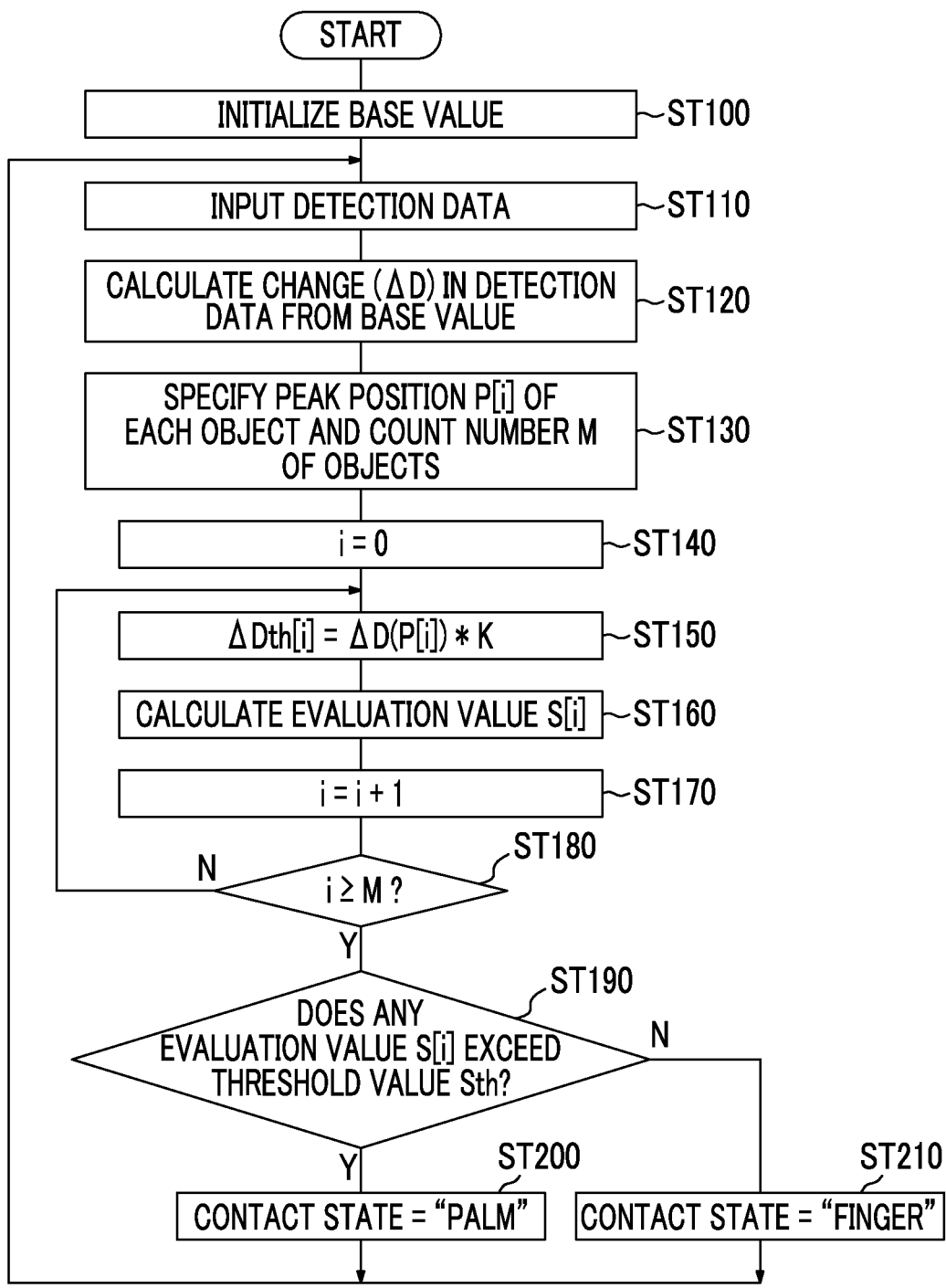
FIG. 4 is a flowchart illustrating an example of an operation of discriminating between a finger and a palm in the input device according to this embodiment.
Figure 5:
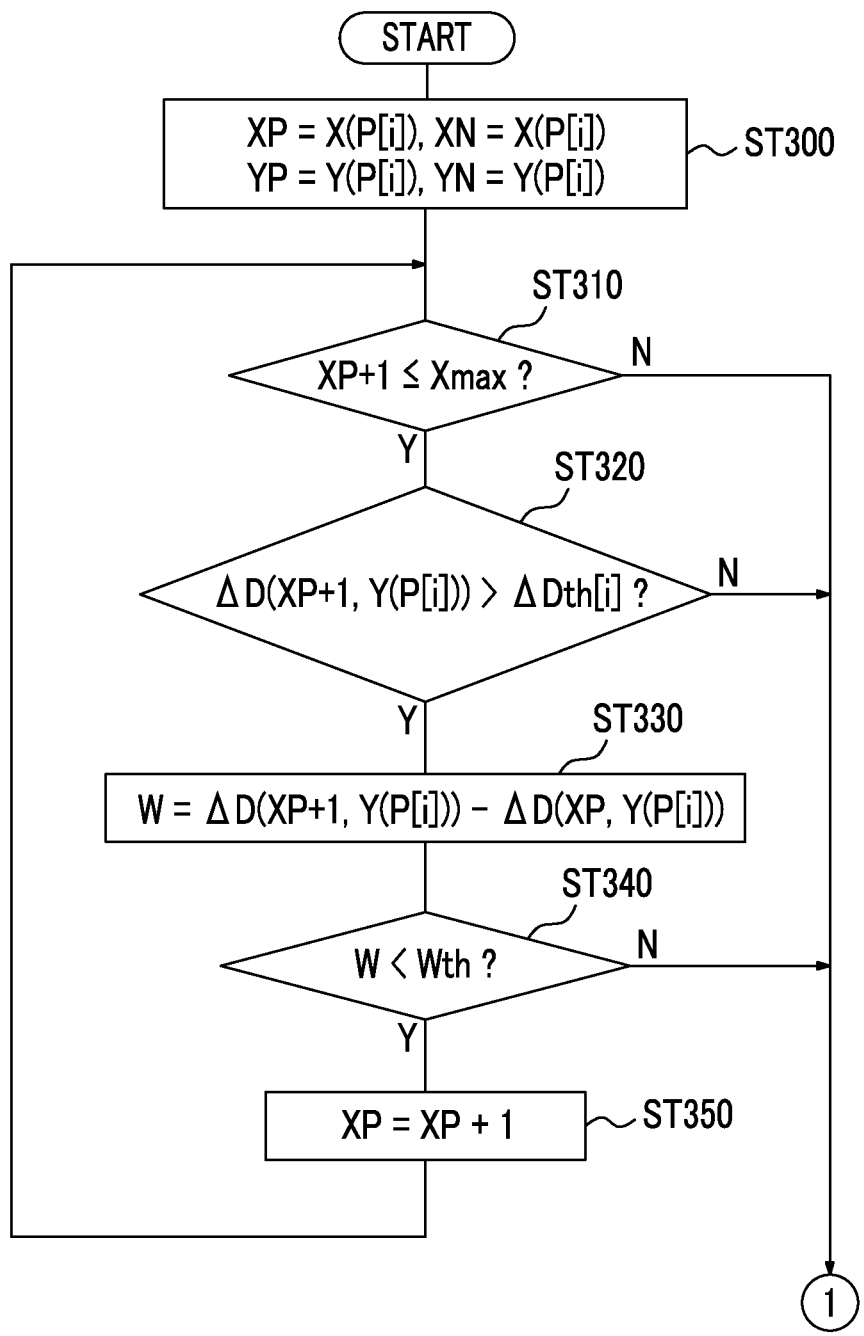
FIG. 5 is a first flowchart illustrating an example of a process of calculating an evaluation value in an evaluation value calculation unit.
Figure 6:
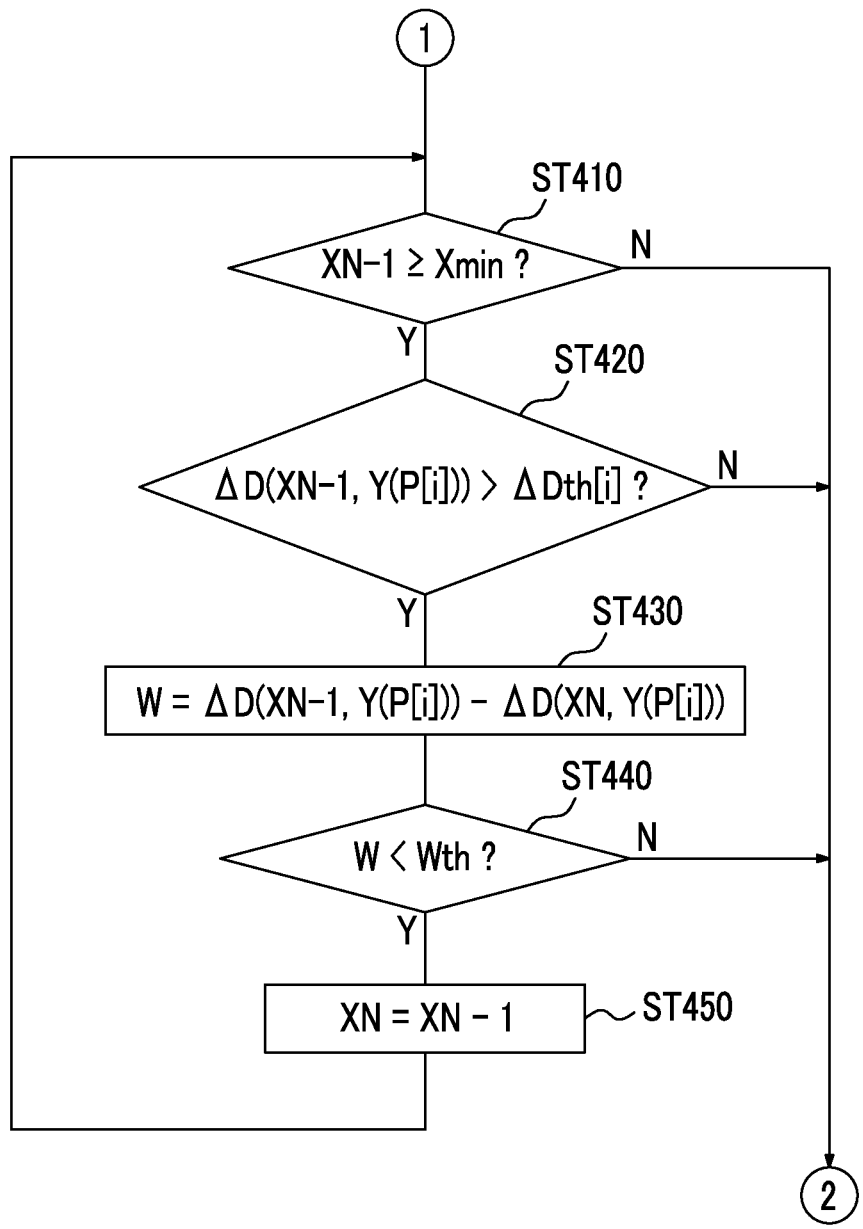
FIG. 6 is a second flowchart illustrating the example of the process of calculating an evaluation value in the evaluation value calculation unit.
Figure 7:
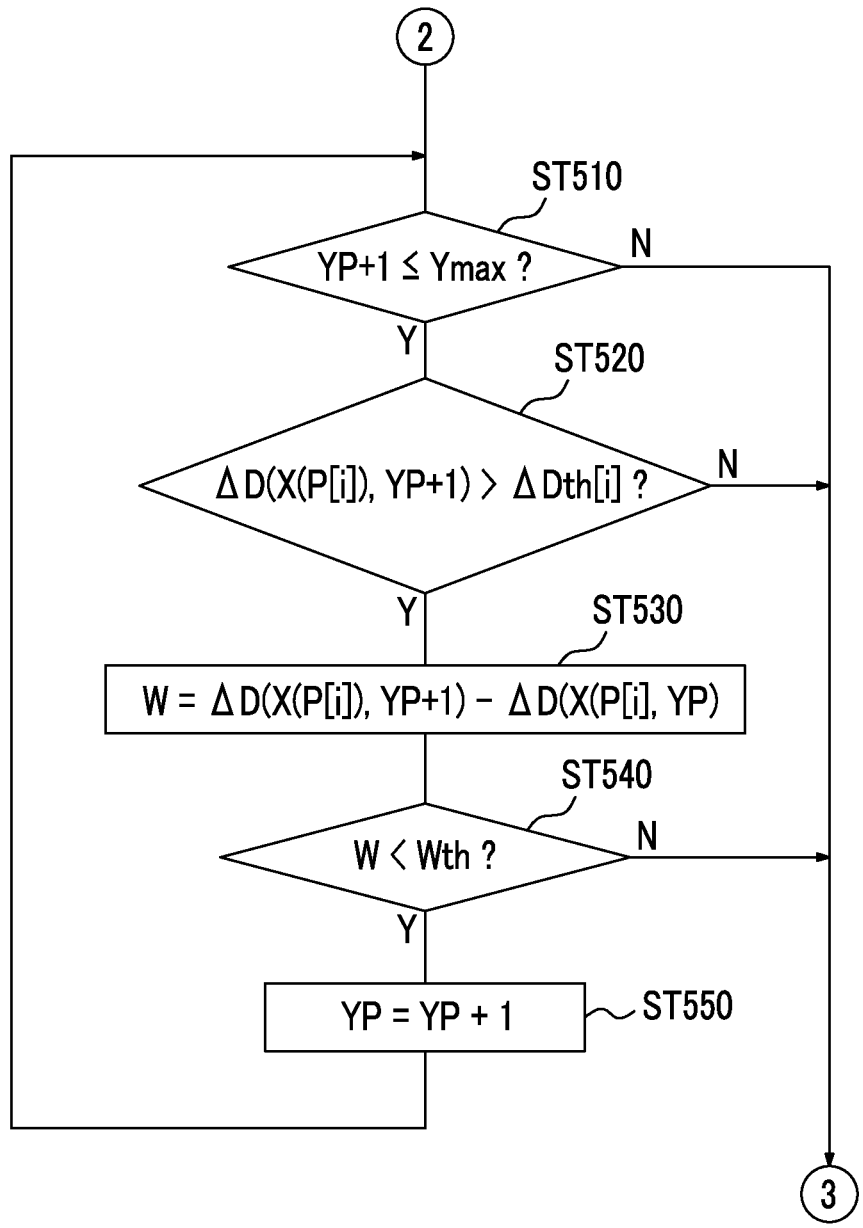
FIG. 7 is a third flowchart illustrating the example of the process of calculating an evaluation value in the evaluation value calculation unit.

FIG. 4 is a flowchart illustrating an example of an operation of discriminating between a finger and a palm in the input device according to this embodiment.

When the operation starts, the two-dimensional data generation unit 22 initializes the base values of the respective detection positions stored in the base value memory of the storage unit 30 to predetermined values (ST100).

The two-dimensional data generation unit 22 periodically receives the detection data of the detection position from the sensor unit 10 (ST110), calculates a difference between the received detection data and the base value stored in and the base value memory, and stores the result of the calculation in the storage unit 30 as detection data ΔD of each detection position (ST120).

The peak position specifying unit 23 specifies the peak position P at which the degree of the proximity of the object is higher than that of surrounding detection positions based on the detection data ΔD of the detection positions stored in the storage unit 30, and counts the number M of the objects of which the peak position P is specified (ST130). Further, the peak position specifying unit 23 assigns the identification number i ($0 \leq i \leq M-1$) from "0" to "M−1" to each of the M specified peak positions P.

When the threshold value setting unit 24 initializes the identification number i to "0" (ST140), and sets the threshold value ΔDth[i] based on the detection data ΔD(P[i]) at the peak position P[i] (ST150). The threshold value setting unit 24 multiplies the detection data ΔD(P[i]) by a predetermined coefficient K ($0<K<1$), and sets a result of the multiplication as a threshold value ΔDth[i].

When the threshold value ΔDth[i] is set by the threshold value setting unit 24, the evaluation value calculation unit 25 calculates the evaluation value S[i] according to an area of a region in which the degree of the proximity is higher than the threshold value ΔDth[i] around the peak position P[i] (ST160).

When the evaluation value S[i] is calculated by the evaluation value calculation unit 25, the threshold value setting unit 24 increments the identification number i by 1 (ST170), and compares the identification number i after incrementing with the object number M (ST180). When the identification number i is smaller than the object number M, the threshold value setting unit 24 returns to step ST50 to set the threshold value ΔDth[i] again.

When the identification number i reaches the object number M, the determination unit 26 compares the respective evaluation values S[0] to S[M−1] calculated in step ST160 with the threshold value Sth (ST190). When any of the evaluation values S[0] to S[M−1] exceeds the threshold value Sth, the determination unit 26 determines that a contact state is a "palm contact state" (ST200). When all of the evaluation values S[0] to S[M−1] are smaller than the threshold value Sth, the determination unit 26 determines that the contact state is a "finger contact state" (ST210).

FIGS. 5 to 8 are flowcharts illustrating an example of a process (ST160) of calculating the evaluation value S in the evaluation value calculation unit 25.

First, the evaluation value calculation unit 25 initializes X coordinates (XP, XN) and Y coordinates (YP, YN) defining boundaries in the X direction of the rectangular region in which the detection data ΔD exceeds the threshold value ΔDth[i] to coordinates of the peak position P[i] (ST300). That is, the evaluation value calculation unit 25 initializes "XP" and "XN" to "X(P[i])" that is an X coordinate of the peak position P[i], and initializes "YP" and "YN" to "Y(P[i])" that is a Y coordinate of the peak position P[i].

Here, the "X coordinate" indicates an order in the X direction (in the example of FIG. 3A, a direction from left to right) in an arrangement in a matrix form of the detection positions, and has an integer value from a minimum value Xmin to a maximum value Xmax. Further, the "Y coordinate" indicates an order in the Y direction (in the example of FIG. 3A, a direction from top to bottom) in the arrangement in a matrix form of the detection positions, and has an integer value from a minimum value Ymin to a maximum value Ymax.

Figure 8:
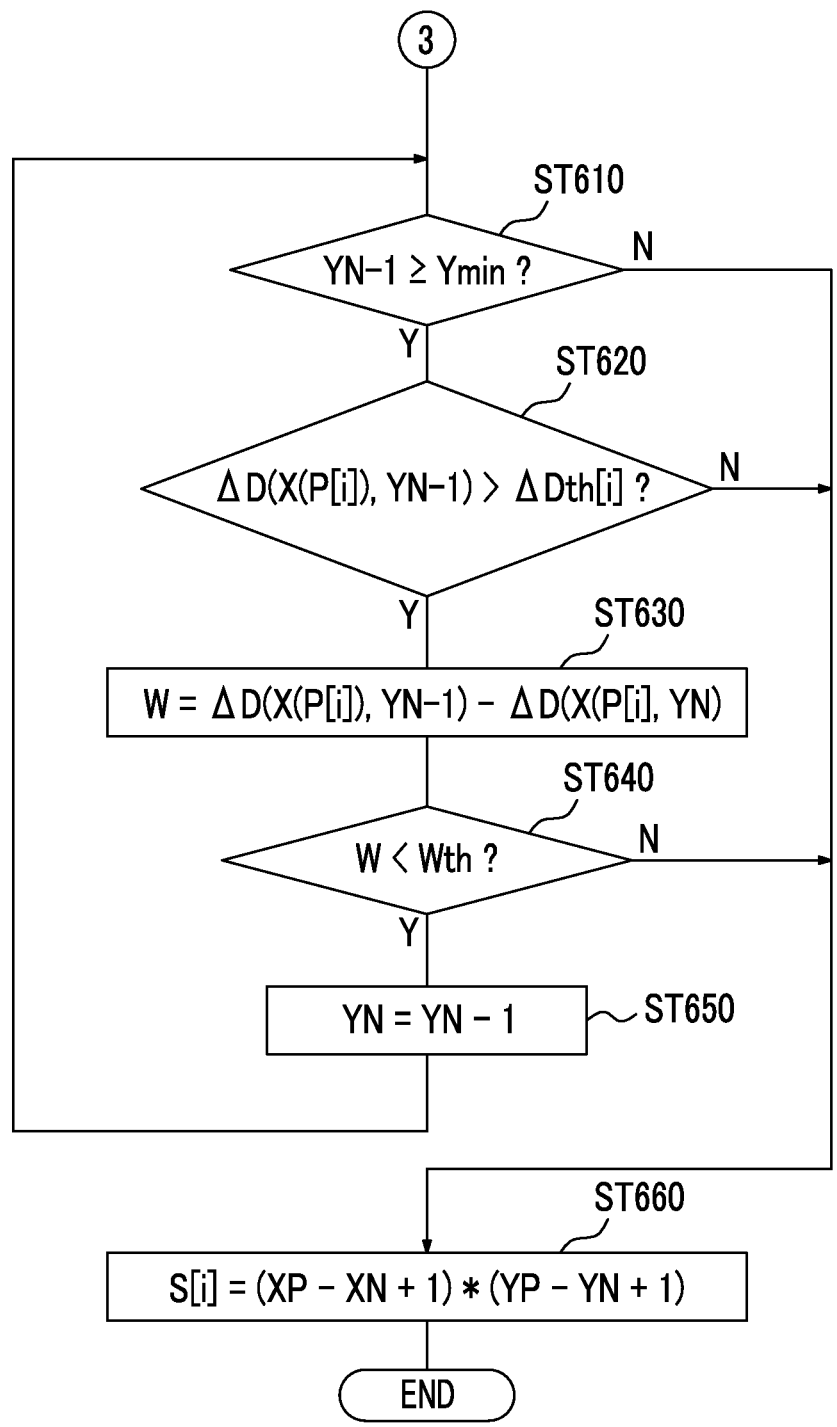
FIG. 8 is a fourth flowchart illustrating the example of the process of calculating an evaluation value in the evaluation value calculation unit.

Then, the evaluation value calculation unit 25 searches for respective coordinates "XP", "XN", "YP", and "YN" of boundaries of the rectangular region in which the detection data ΔD exceeds the threshold value ΔDth[i]. The evaluation value calculation unit 25 searches for "XP" in steps ST310 to ST350 (FIG. 5), searches for "XN" in steps ST410 to ST450 (FIG. 6), searches for "YP" in steps ST510 to ST550 (FIG. 7), and searches for "YN" in steps ST610 to ST650 (FIG. 8).

Hereinafter, the X and Y coordinates of the detection position are represented by "(X, Y)".

ST310 to ST350: The evaluation value calculation unit 25 compares a coordinate "XP+1" with the maximum value Xmax (ST310). When the coordinate "XP+1" exceeds the maximum value Xmax, the evaluation value calculation unit 25 ends the search for the coordinate "XP" and proceeds to step ST410.

When the coordinates "XP+1" is equal to or smaller than the maximum value Xmax, the evaluation value calculation unit 25 compares detection data "ΔD(XP+1, Y(P[i]))" at the detection position of coordinates "(XP+1, Y(P[i])" with the threshold value ΔDth[i] (ST320).

When the detection data "ΔD(XP+1, Y(P[i]))" is smaller than the threshold value ΔDth[i], the evaluation value calculation unit 25 ends the search for the coordinates "XP" and proceeds to step ST410.

When the detection data "ΔD(XP+1, Y(P[i]))" is greater than the threshold value ΔDth[i], the evaluation value calculation unit 25 calculates a difference W obtained by subtracting the detection data "ΔD(XP, Y(P[i]))" from the detection data "ΔD(XP+1, Y(P[i]))" (ST330), and compares the difference W with a predetermined change width Wth (ST340).

When the difference "W" is smaller than the change width Wth, the evaluation value calculation unit 25 increments the coordinate "XP" by 1 (ST350), and repeats the process from step ST310. When the difference "W" exceeds the change width Wth, the evaluation value calculation unit 25 ends the search for the coordinate "XP" and proceeds to step ST410.

ST410 to ST450: The evaluation value calculation unit 25 compares the coordinate "XN−1" with the minimum value Xmin (ST410). When the coordinate "XN−1" is smaller than the minimum value Xmin, the evaluation value calculation unit 25 ends the search for the coordinate "XN" and proceeds to step ST510.

When the coordinate "XN−1" is equal to or greater than the minimum value Xmix, the evaluation value calculation unit 25 compares detection data "ΔD(XN−1, Y(P[i]))" at the detection position of the coordinates "(XN−1, Y(P[i])" with the threshold value ΔDth[i] (ST420).

When the detection data "ΔD(XN−1, Y(P[i]))" is smaller than the threshold value ΔDth[i], the evaluation value calculation unit 25 ends the search for the coordinate "XN" and proceeds to step ST510.

When the detection data "ΔD(XN−1, Y(P[i]))" is greater than the threshold value ΔDth[i], the evaluation value calculation unit 25 calculates a difference "W" obtained by subtracting the detection data "ΔD(XN, Y(P[i]))" from the detection data "ΔD(XN−1, Y(P[i]))" (ST430), and compares the difference "W" with a predetermined change width Wth (ST440).

When the difference "W" is smaller than the change width Wth, the evaluation value calculation unit 25 decrements the coordinates "XN" by 1 (ST450), and repeats the process from step ST410. When the difference "W" exceeds the change width Wth, the evaluation value calculation unit 25 ends the search for the coordinate "XN" and proceeds to step ST510.

ST510 to ST550: The evaluation value calculation unit 25 compares the coordinate "YP+1" with the maximum value Ymax (ST510). When the coordinate "YP+1" exceeds the maximum value Ymax, the evaluation value calculation unit 25 ends the search for the coordinate "YP" and proceeds to step ST610.

When the coordinate "YP+1" is equal to or smaller than the maximum value Ymax, the evaluation value calculation unit 25 compares detection data "ΔD(X(P[i], the YP+1)" at the detection position of the coordinates "(X(P[i], YP+1)" with the threshold value ΔDth[i] (ST520).

When the detection data "ΔD(X(P[i], YP+1)" is smaller than the threshold value ΔDth[i], the evaluation value calculation unit 25 ends the search for the coordinate "YP" and proceeds to step ST610.

When the detection data "ΔD(X(P[i], YP+1)" is greater than the threshold value ΔDth[i], the evaluation value calculation unit 25 calculate a difference "W" obtained by subtracting the detection data "ΔD(X(P[i], YP)" from the detection data "ΔD(X(P[i], YP+1))" (ST530), and compares the difference "W" with a predetermined change width Wth (ST540).

When the difference "W" is smaller than the change width Wth, the evaluation value calculation unit 25 increments the coordinate "YP" by 1 (ST550), and repeats the process from step ST510. When the difference "W" exceeds the change width Wth, the evaluation value calculation unit 25 ends the search for the coordinate "YP" and proceeds to step ST610.

ST610 to ST650: The evaluation value calculation unit 25 compares the coordinate "YN−1" with the minimum value Ymin (ST610). When the coordinate "YN−1" is smaller than the minimum value Ymin, the evaluation value calculation unit 25 ends the search for the coordinate "YN" and proceeds to step ST660.

When the coordinate "YN−1" is equal to or greater than the minimum value Ymin, the evaluation value calculation unit 25 compares the detection data "ΔD(X(P[i]), YN−1)" at the detection position of the coordinates "(X(P[i]), YN−1)" with the threshold value ΔDth[i] (ST620).

When the detection data "ΔD(X(P[i]), YN−1)" is smaller than the threshold value ΔDth[i], the evaluation value calculation unit 25 ends the search for the coordinate "YN" and proceeds to step ST660.

When the detection data "ΔD(X(P[i]), YN−1)" is greater than the threshold value ΔDth[i], the evaluation value calculation unit 25 calculates a difference "W" obtained by subtracting the detection data "ΔD(X(P[i]), YN) from the detection data "ΔD(X(P[i]), YN−1)" (ST630), and compares the difference "W" with the predetermined change width Wth (ST640).

When the difference "W" is smaller than the change width Wth, the evaluation value calculation unit 25 decrements the coordinate "YN" by 1 (ST650), and repeats the process from step ST610. When the difference "W" exceeds the change width Wth, the evaluation value calculation unit 25 ends the search for the coordinate "YN" and proceeds to step ST660.

When the respective coordinates "XP", "XN", "YP", and "YN" are searched for, the evaluation value calculation unit 25 calculates a product of the number "XP−XN+1" of the detection positions in the X direction of the rectangular region and the number "YP−YN+1" of detection positions in the Y direction of the rectangular region as the evaluation value S[i] (ST660).

As described above, according to the input device of the present embodiment, the threshold value ΔDth smaller than the degree of the proximity of the object indicated by the detection data ΔD at the peak position P is set based on the detection data ΔD at the peak position P at which the degree of proximity of the object becomes higher than that of surrounding detection positions. The evaluation value S according to an area of a region on the detection surface occupied by a group of detection positions, including the peak position P, in which the degree of the proximity of the object indicated by the detection data ΔD is higher than the threshold value ΔDth, is calculated, and it is determined whether the object in proximity to the peak position P is the finger or the palm based on the evaluation value S.

Thus, a difference between the "finger" and the "palm" increases in an area of the region in which the value of the detection data ΔD exceeds the threshold value ΔDth, and a difference between the "finger" and the "palm" also increases in the evaluation value S. Therefore, it is possible to accurately discriminate between the "finger" and the "palm" as compared with the case in which the fixed threshold value is used.

Further, according to the input device of the present embodiment, since the evaluation value S according to the area of the region in which the value of the detection data ΔD exceeds the threshold value ΔDth around the peak position P is used, a complex process such as spectral analysis is not necessary, and it is possible to perform the discrimination between the "finger" and the "palm" through a simple process.

Further, according to the input device of the present embodiment, the number of detection positions (first detection position number) in a "first detection position group" arranged continuously in the X direction on the detection surface in which the peak position P is included and the degree of the proximity of the object indicated by the detection data ΔD is higher than the threshold value ΔDth is counted. The number of detection positions (second detection position number) in a "second detection position group" arranged continuously in the Y direction on the detection surface in which the peak position P is included and the degree of the proximity of the object indicated by the detection data ΔD is higher than the threshold value ΔDth is counted. The evaluation value S according to a product of the first detection position number and the second detection position number is calculated. Accordingly, since the evaluation value S can be easily calculated, it is possible to discriminate between the "finger" and the "palm" through a simple process.

Further, according to the input device of the present embodiment, when the degree of the proximity indicated by the detection data ΔD at the adjacent detection position separated from the peak position P with respect to one detection position in the first detection position group arranged in the X direction exceeds the predetermined change width Wth and is higher than the degree of proximity indicated by the detection data ΔD at the one detection position, the first detection position number from which the number of detection positions separated from the peak position P relative to the one detection position has been excluded is counted.

Further, when the degree of the proximity indicated by the detection data ΔD at the adjacent detection position separated from the peak position P with respect to one detection position in the second detection position group arranged in the Y direction exceeds the predetermined change width Wth and is higher than the degree of proximity indicated by the detection data ΔD at the one detection position, the second detection position number from which the number of detection positions separated from the peak position P relative to the one detection position has been excluded is counted. Accordingly, the region in which the detection data ΔD is greater than the threshold value ΔDth due to an influence from an object other than the object in proximity to the peak position P can be excluded from a target region of the evaluation value S. Therefore, even when another object is in proximity to the detection surface, it is possible to accurately represent a width of the proximity region of the object in proximity to the peak position P using the evaluation value S, and to accurately perform the discrimination between the "finger" and the "palm".

While various embodiments of the present invention have been described above, the present invention is not limited to the above-described embodiments and includes various variations.

The example in which the threshold value ΔDth indicating the degree of the proximity at a given percentage of the degree of the proximity of the detection data ΔD at the peak position P is set has been described in the above-described embodiment, but the present invention is not limited thereto. In other embodiments of the present invention, the threshold value setting unit 24 may set the threshold value ΔDth (ΔDth=ΔD−α) so that the threshold value indicates a degree of proximity smaller by a predetermined value α than the degree of proximity indicated by the detection data ΔD at the peak position P. In this case, when the degree of proximity indicated by the detection data ΔD at the peak position P changes, the threshold value ΔDth relatively changes accordingly. Thus, the difference between the "finger" and the "palm" can increase in the area of the region in which the value of the detection data ΔD exceeds the threshold value ΔDth. Therefore, since the difference between the "finger" and the "palm" can increase in the evaluation value S, it is possible to improve the accuracy of discrimination between the "finger" and the "palm".

Figure 9:
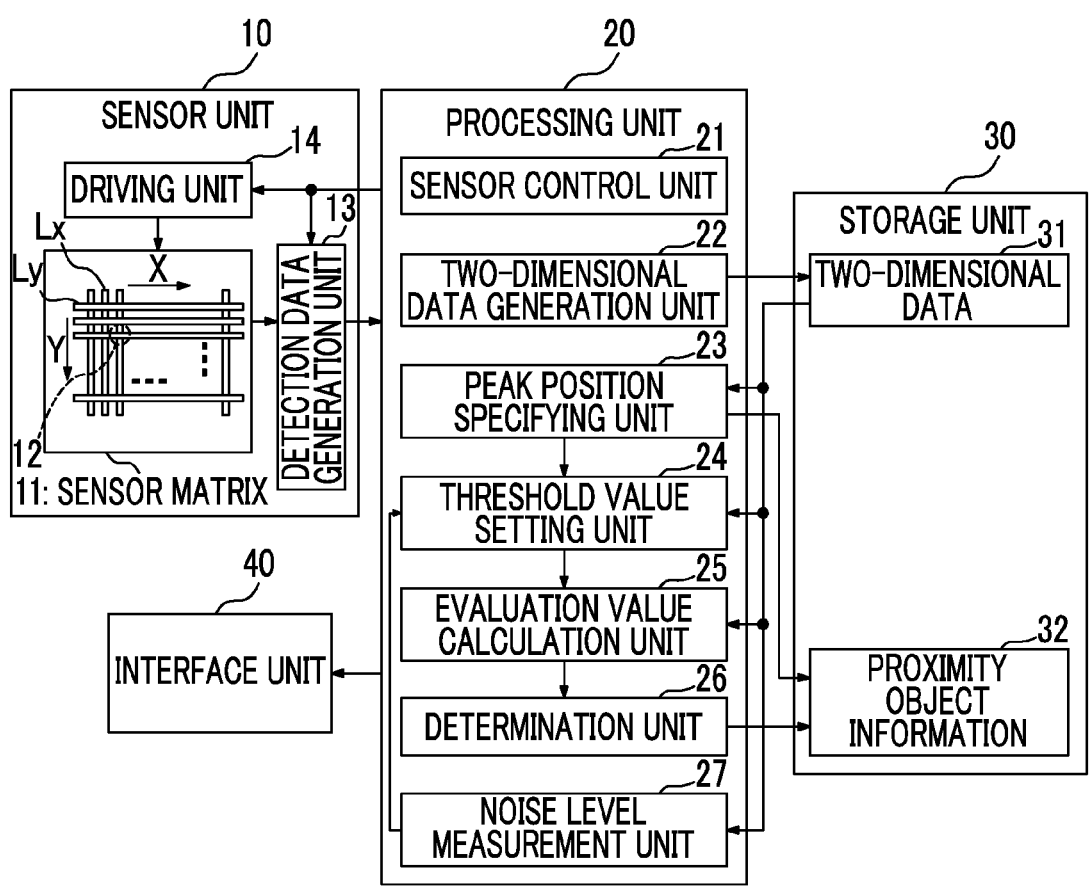
FIG. 9 is a diagram illustrating a modification example of the input device according to this embodiment.

Further, while the example in which the threshold value ΔDth relatively changes according to the detection data ΔD at the peak position P has been described in the above-described embodiment, the threshold value ΔDth may be further adjusted according to a measurement value of noise level in other embodiments of the present invention. FIG. 9 is a diagram illustrating a modification example thereof. An input device illustrated in FIG. 9 has the same configuration as the input device illustrated in FIG. 1, and includes a noise level measurement unit 27 as a processing block included in the processing unit 20. The noise level measurement unit 27 measures the level of noise superimposed on the detection data ΔD from the size of a variation of a value or the like based on a plurality of detection data ΔD (which may be detection data before the base value is subtracted therefrom) generated for a plurality of detection positions on the detection surface. The threshold value setting unit 24 changes the threshold value ΔDth according to a result of the measurement of the noise level in the noise level measurement unit 27. For example, the threshold value setting unit 24 increases the threshold value ΔDth to prevent the noise from being erroneously recognized as a finger or a palm when the noise level is high.

Thus, by changing the threshold value ΔDth according to the noise level, it is possible to make erroneous determination due to noise unlikely.

The input device of the present invention is not limited to a user interface device that inputs information using an operation of a finger or the like. That is, the input device of the present invention can be widely applied to a device that inputs information according to a state of proximity to the detection surface of various objects that are not limited to appendages of a human body.

It should be understood by those skilled in the art that various modifications, combinations, sub-combinations and alterations may occur depending on design requirements and other factors insofar as they are within the scope of the appended claims of the equivalents thereof.

What is claimed is:

1. An input device for inputting information according to a state of proximity of an object thereto, the input device comprising:
    a detection surface to which the object approaches;
    a sensor unit configured to detect a degree of proximity of the object at a plurality of detection positions on the detection surface, and to generate detection data indicating a result of the detection for each of the plurality of detection positions; and
    a processor implementing:
        a peak position specifying unit configured to specify, as a peak position, the detection position at which the degree of proximity of the object is higher than that of surrounding detection positions based on the detection data generated for the plurality of detection positions;
        a threshold value setting unit configured to set, based on the detection data at the peak position, a threshold value smaller than a value corresponding to the degree of the proximity of the object indicated by the detection data at the peak position;
        an evaluation value calculation unit configured to calculate an evaluation value only from a first group of detection positions and a second group of detection positions on the detection surface at which the degree of proximity of the object indicated by the detection data is higher than the threshold value, the first group of the detection positions including the peak position and being successively arranged in a first direction, and the second group of the detection positions including the peak position and being successively arranged in a second direction perpendicular to the first direction; and
        a determination unit configured to determine whether the object in proximity to the peak position is a finger or a palm based on the evaluation value.

2. The input device according to claim 1,
    wherein the threshold value setting unit sets the threshold value indicating a predetermined percentage of the degree of the proximity indicated by the detection data at the peak position.

3. The input device according to claim 1,
    wherein the threshold value setting unit sets the threshold value indicating a degree of proximity which is by a predetermined amount lower than the degree of the proximity indicated by the detection data at the peak position.

4. The input device according to claim 1,
    wherein the evaluation value calculation unit is further configured to obtain a first detection position number by counting a number of the detection positions in the first group of the detection position, and a second detection position number by counting a number of the detection positions in the second group of the detection positions, and
    wherein the evaluation value calculation unit calculates the evaluation value according to a product of the first detection position number and the second detection position number.

5. The input device according to claim 4,
    wherein the evaluation value calculation unit is further configured to:
        modify the first detection position number by removing a first subset of the detection positions from the first group of the detection positions, the first subset of the detection positions being farther from the peak position than one detection position in the first group, if the degree of the proximity indicated by the detection data at an adjacent detection position in the first subset next to the one detection position exceeds the degree of proximity indicated by the detection data at the one detection position by a predetermined change amount or greater, and
        modify the second detection position number by removing a second subset of the detection positions from the second group of the detection positions, the second subset of the detection positions being farther from the peak position than one detection position in the second group, if the degree of the proximity indicated by the detection data at an adjacent detection position in the second subset next to the one detection position in the second group exceeds the degree of proximity indicated by the detection data at the one detection position in the second group by a predetermined change amount.

6. The input device according to claim 1, further comprising:
    a noise level measurement unit configured to measure a level of noise superimposed on the detection data based on the detection data generated for the plurality of detection positions,
    wherein the threshold value setting unit changes the threshold value according to the result of the measurement of the noise level.

7. A method of controlling an input device for imputing information according a state of proximity of an object thereto, the input device including a detection surface to which the object approaches, a sensor unit configured to detect a degree of proximity of the object at a plurality of detection positions on the detection surface and generate detection data indicating a result of the detection for each of the plurality of detection positions, the method comprising the steps of:
    specifying, as a peak position, the detection position at which the degree of proximity of the object is higher than that of surrounding detection positions, based on the detection data generated for the plurality of detection positions;

setting, based on the detection data at the peak position, a threshold value smaller than a value corresponding to the degree of the proximity of the object indicated by the detection data at the peak position;

calculating an evaluation value only from a first group of detection positions and a second group of detection positions on the detection surface at which the degree of proximity of the object indicated by the detection data is higher than the threshold value, the first group of the detection positions including the peak position and being successively arranged in a first direction, and the second group of the detection positions including the peak position and being successively arranged in a second direction perpendicular to the first direction; and determining whether the object in proximity to the peak position is a finger or a palm based on the evaluation value.

8. The method of controlling an input device according to claim 7, wherein the step of setting the threshold value includes setting the threshold value indicating a predetermined percentage of the degree of the proximity indicated by the detection data at the peak position.

9. The method of controlling an input device according to claim 7, wherein the step of setting the threshold value includes setting the threshold value indicating a degree of proximity which is by a predetermined amount lower than the degree of the proximity indicated by the detection data at the peak position.

10. The method of controlling an input device according to claim 7, wherein the step of calculating the evaluation value includes the steps of:
obtaining a first detection position number by counting a number of detection positions in the first group of the detection positions;
obtaining a second detection position number by counting a number of detection positions in the second group of the detection positions; and
calculating the evaluation value according to a product of the first detection position number and the second detection position number.

11. The method of controlling an input device according to claim 10, wherein the step of obtaining the first detection position number includes modifying the first detection position number by removing a first subset of the detection positions from the first group of the detection positions, the first subset of the detection position being farther from the peak position than one detection position in the first group, if the degree of the proximity indicated by the detection data at an adjacent detection position in the subset next to the one detection position in the first group exceeds the degree of proximity indicated by the detection data at the one detection position by a predetermined change amount or greater, and the step of counting the second detection position number includes modifying the second detection position number by removing a second subset of the detection positions from the second group of the detection positions, the second subset of the detection positions being farther from the peak position than one detection position in the second group, if the degree of the proximity indicated by the detection data at an adjacent detection position in the second subset next to the one detection position in the second group exceeds the degree of proximity indicated by the detection data at the one detection position by a predetermined change amount or greater.

12. The method of controlling an input device according to claim 7, further comprising:

measuring a level of noise superimposed on the detection data based on the detection data for the plurality of detection positions, wherein the step of setting the threshold value includes changing the threshold value according to the result of the measurement of the noise level.

* * * * *